(12) United States Patent
Bailey et al.

(10) Patent No.: US 9,200,571 B2
(45) Date of Patent: Dec. 1, 2015

(54) FUEL NOZZLE ASSEMBLY FOR A GAS TURBINE ENGINE

(75) Inventors: Donald Mark Bailey, Simpsonville, SC (US); Scott R. Simmons, Simpsonville, SC (US); Marcus B. Huffman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1431 days.

(21) Appl. No.: 12/498,494

(22) Filed: Jul. 7, 2009

(65) Prior Publication Data

US 2011/0005230 A1    Jan. 13, 2011

(51) Int. Cl.

| F23R 3/20 | (2006.01) |
|---|---|
| F02C 7/22 | (2006.01) |
| F23R 3/14 | (2006.01) |
| F23R 3/28 | (2006.01) |
| F23M 20/00 | (2014.01) |

(52) U.S. Cl.
CPC ............... *F02C 7/22* (2013.01); *F23M 20/005* (2015.01); *F23R 3/14* (2013.01); *F23R 3/283* (2013.01); *F23R 3/286* (2013.01); *F05D 2240/128* (2013.01); *F23D 2900/00008* (2013.01); *F23R 2900/00014* (2013.01); *F23R 2900/00017* (2013.01); *F23R 2900/00018* (2013.01)

(58) Field of Classification Search
CPC ........... F02C 7/22; F23M 20/005; F23R 3/14; F23R 3/283; F23R 3/286; F23R 2900/00014; F23R 2900/00017; F23R 2900/00018; F05D 2240/128; F23D 2900/00008

USPC ......... 60/748, 737, 740, 742, 746, 750, 39.37
See application file for complete search history.

(56) References Cited

U.S. PATENT DOCUMENTS

| 4,258,544 | A | 3/1981 | Gebhart et al. |
|---|---|---|---|
| 5,307,635 | A | 5/1994 | Graves et al. |
| 6,272,842 | B1 | 8/2001 | Dean |
| 6,568,077 | B1 * | 5/2003 | Hellemann et al. .......... 29/889.1 |
| 6,698,207 | B1 * | 3/2004 | Wiebe et al. .................... 60/737 |
| 6,721,631 | B2 | 4/2004 | Shimizu et al. |
| 6,761,035 | B1 | 7/2004 | Mueller |
| 6,886,346 | B2 * | 5/2005 | Sobieski et al. ................ 60/776 |
| 6,926,496 | B2 | 8/2005 | Ackermann et al. |

(Continued)

FOREIGN PATENT DOCUMENTS

| JP | 2000240944 A | 9/2000 |
|---|---|---|
| JP | 2001329861 A | 11/2001 |

(Continued)

OTHER PUBLICATIONS

Unofficial English translation of a JP Office Action dated Feb. 12, 2014 issued in connection with corresponding JP Application No. 2010-150705.

*Primary Examiner* — Phutthiwat Wongwian
*Assistant Examiner* — Vikansha Dwivedi
(74) *Attorney, Agent, or Firm* — Armstrong Teasdale LLP

(57) ABSTRACT

A fuel nozzle assembly for a gas turbine engine includes a flange and a pre-mix tube. The flange includes a first end that is configured to couple to an end cover of the combustor, and a second end that is opposite said first end. The pre-mix tube is coupled at a first end to the flange second end. The flange and the pre-mix tube are fabricated to operate at a natural frequency that is different from an operating frequency of the gas turbine engine.

18 Claims, 5 Drawing Sheets

(56) References Cited

U.S. PATENT DOCUMENTS

| | | |
|---|---|---|
| 7,284,378 B2 | 10/2007 | Amond, III et al. |
| 2005/0146396 A1* | 7/2005 | Sugawara .................... 333/133 |
| 2008/0053062 A1 | 3/2008 | Tuttle |
| 2008/0072602 A1 | 3/2008 | Wasif et al. |
| 2008/0105237 A1 | 5/2008 | Gandza |

FOREIGN PATENT DOCUMENTS

| | | |
|---|---|---|
| JP | 2003065536 A | 3/2003 |
| JP | 2005345095 A | 12/2005 |

* cited by examiner

FUEL NOZZLE ASSEMBLY FOR A GAS TURBINE ENGINE

BACKGROUND OF THE INVENTION

The field of the invention relates generally to gas turbine engines and, more particularly, to center fuel nozzles used within gas turbine engines.

At least some known gas turbine engines ignite a fuel-air mixture in a combustor to generate a combustion gas stream that is channeled to a turbine via a hot gas path. Compressed air is channeled to the combustor by a compressor. Combustor assemblies typically use fuel nozzles that facilitate fuel and air delivery to a combustion region of the combustor. The turbine converts the thermal energy of the combustion gas stream to mechanical energy that rotates a turbine shaft. The output of the turbine may be used to power a machine, for example, an electric generator or a pump.

Known fuel nozzle assemblies include a flange that extends from an end cover that serves as the structural base of the fuel nozzle. A premix tube extends from the flange and is coupled to a swirler. The natural frequency of the fuel nozzle assemblies are generally a function of both the shape and length of the flange and premix tube combination. Moreover, in known fuel nozzle assemblies, the operating frequency of the gas turbine engine may produce low cycle and/or high cycle fatigue in fuel nozzle components and joints, such as for example, the flange, the premix tube, and/or the swirler, and/or joints defined between the components. Moreover, in known fuel nozzle assemblies, stress concentrations around the fuel nozzle assembly and/or an increase in structural break-out into the fuel holes as a result of the fuel nozzle assembly may develop if the natural frequency is similar to, or substantially the same as, the operating rotor frequency (including first through fourth multiple of rotor frequency), combustion tones and siren tones of the gas turbine engine.

Many known fuel nozzle assemblies use a variety of components that are manufactured from a variety of materials and that are coupled together with welded and brazed joints, such as along the joints defined between the flange, the premix tube and/or the swirler. Because of the different material properties, the different components may have different thermal growth rates and/or magnitudes of thermal expansion and contraction. Additionally, over time, the welded and brazed joints may be prone to fatigue, cracking, or premature failure during operation when exposed to the operating frequencies produced by the gas turbine engine.

BRIEF DESCRIPTION OF THE INVENTION

In one embodiment, a fuel nozzle assembly for a gas turbine engine is provided. The fuel nozzle assembly includes a flange and a pre-mix tube. The flange includes a first end that is configured to couple to an end cover of the combustor, and a second end that is opposite said first end. The pre-mix tube is coupled at a first end to the flange second end. The flange and the pre-mix tube are fabricated to operate at a natural frequency that is different from an operating frequency of the gas turbine engine.

In another embodiment, a gas turbine engine is provided. The gas turbine engine includes a combustor and a fuel nozzle assembly that includes a flange and a pre-mix tube. The flange includes a first end that is configured to couple to an end cover of the combustor, and a second end that is opposite said first end. The pre-mix tube is coupled at a first end to the flange second end. The flange and the pre-mix tube are fabricated to operate at a natural frequency that is different from an operating frequency of the gas turbine engine.

In yet another embodiment, a method of assembling a gas turbine engine is provided. The method includes coupling a first end of a flange to a combustor end cover surface, wherein the flange comprises a second end that is opposite said first end, and coupling a first end of a pre-mix tube to the flange second end. The method also includes fabricating the flange and the pre-mix tube such that when assembled, the flange and the pre-mix tube operate at a natural frequency that is different from an operating rotor frequency (including first through fourth multiple of rotor frequency), combustion tones and siren tones of the gas turbine engine.

Various refinements exist of the features noted in relation to the above-mentioned aspects of the present invention. Additional features may also be incorporated in the above-mentioned aspects of the present invention as well. Such refinements and additional features may exist individually or in any combination. For example, various features discussed below in relation to any of the illustrated embodiments of the present invention may be incorporated into any of the above-described aspects of the present invention, alone or in any combination.

BRIEF DESCRIPTION OF THE DRAWINGS

Non-limiting and non-exhaustive embodiments are described with reference to the following figures, wherein like reference numerals refer to identical components throughout the various figures unless otherwise specified.

DETAILED DESCRIPTION OF THE INVENTION

Figure 1:
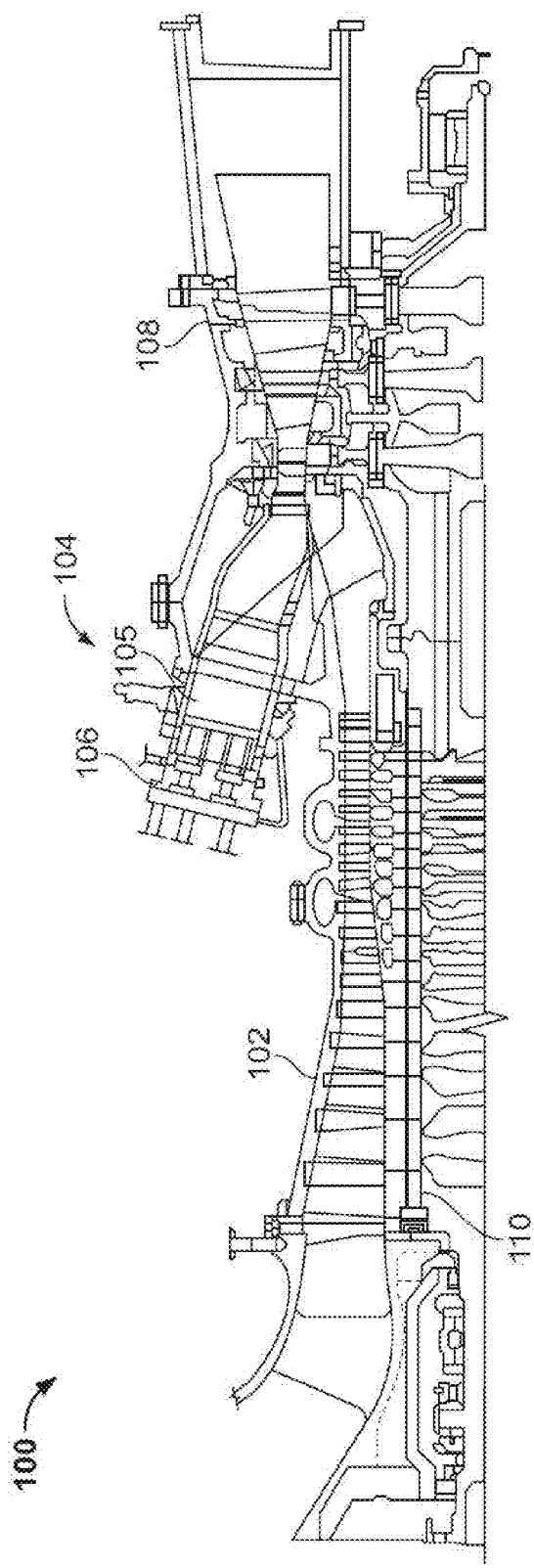
FIG. 1 is a schematic illustration of an exemplary combustion turbine engine.

FIG. 1 is a schematic illustration of an exemplary gas turbine engine 100. In the exemplary embodiment, engine 100 includes a compressor 102 and a combustor 104. Combustor 104 includes a combustion region 105 and a fuel nozzle assembly 106. Engine 100 also includes a turbine 108 and a common compressor/turbine shaft 110 (sometimes referred to as rotor 110). Compressor 102 also is rotatably coupled to rotor 110. In the exemplary embodiment, there is a plurality of combustors 104 and fuel nozzle assemblies 106. In the following discussion, unless otherwise indicated, only one of each component will be discussed. In one embodiment, gas turbine engine 100 is a PG9371 9FBA Heavy Duty Gas Turbine Engine commercially available from General Electric Company, Greenville, S.C. Notably, the present invention is not limited to any one particular engine and may be used in connection with other gas turbine engines, for example, such as the MS7001FA (7FA), MS9001FA (9FA), MS7001FB (7FB) and MS9001FB (9FB) engine models commercially available from General Electric Company, Greenville, S.C.

During operation, air flows through compressor 102 and compressed air is supplied to combustor 104. Specifically, a substantial amount of the compressed air is supplied to fuel nozzle assembly 106 that is integral to combustor 104. Some combustors have at least a portion of air flow from compressor 104 distributed to a dilution air sub-system (not shown in FIG. 1) and most combustors have at least some seal leakage. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel, for example, natural gas and/or fuel oil, that generates a high temperature combustion gas stream. Combustor 104 is coupled in flow communication with turbine 108 and turbine 108 converts thermal energy from the combustion gases discharged by Combustor 104 to mechanical rotational energy. Turbine 108 is rotatably coupled to rotor 110.

Figure 2:
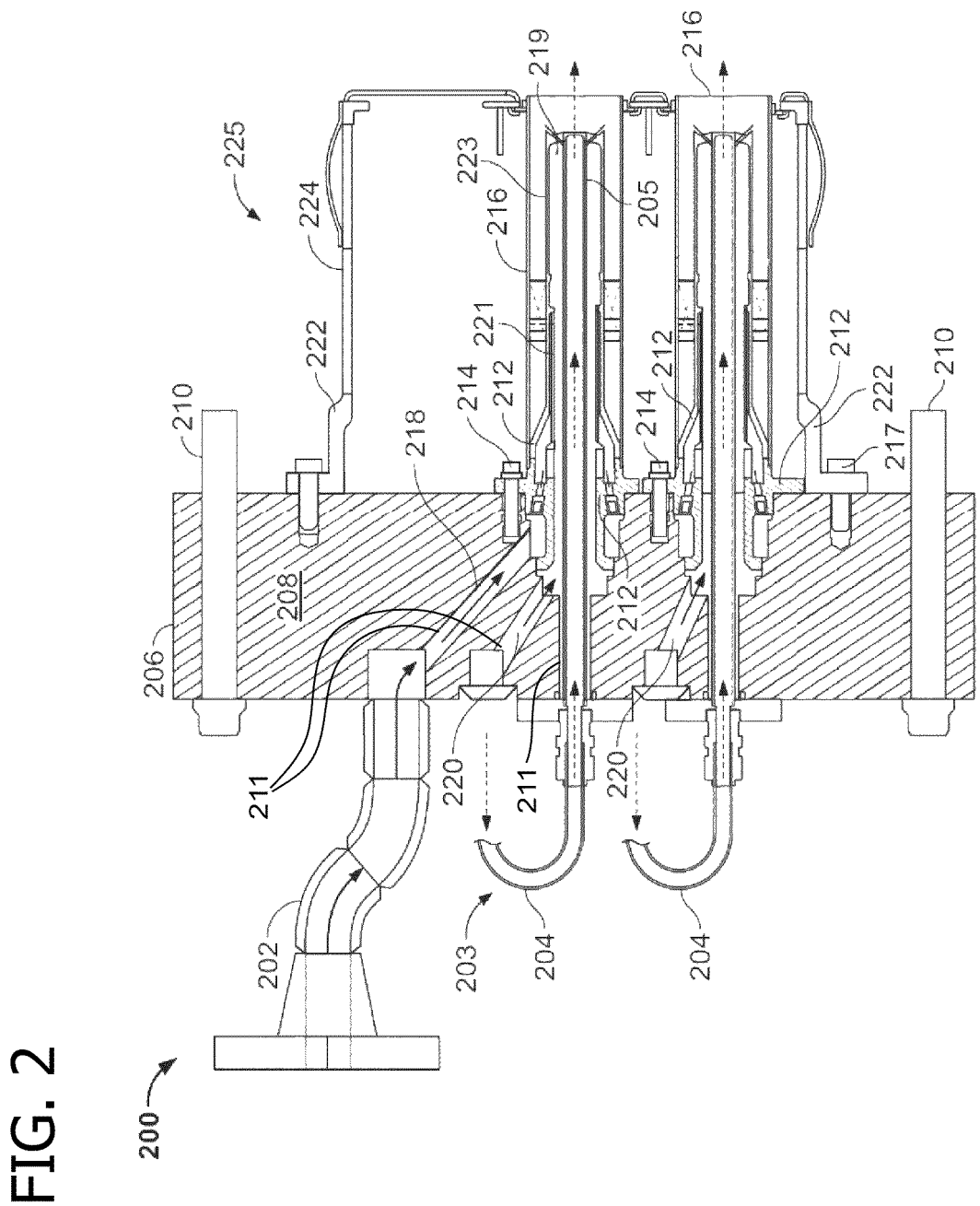
FIG. 2 is a fragmentary illustration of an exemplary fuel delivery system that may be used with the turbine engine shown in FIG. 1.

FIG. 2 is a fragmentary illustration of an exemplary fuel delivery assembly 200 that may be used with turbine engine 100 (shown in FIG. 1) as a component of combustor 104 (shown in FIG. 1). In the exemplary embodiment, fuel delivery assembly 200 includes at least one fuel supply feed 202 and an atomized air cartridge sub-assembly 203. Sub-assembly 203 includes a plurality of air supply tubes 204 that are coupled to a plurality of inner atomized air tubes 205. Fuel nozzle assembly 200 also includes a combustor end cover sub-assembly 206. Cover sub-assembly 206 includes a plurality of premix fuel supply passages 218 for channeling air and fuel (discussed further below), an end cover plate body 208, and a plurality of end cover-to-combustor casing fasteners 210. In the exemplary embodiment, body 208 is formed via a machining process wherein a plurality of channels 211 are formed within body 208 that are sized to receive, but are not limited to only receiving, premix fuel supply passages 218, a diffusion fuel supply passage 220, a plurality of atomized air supply tubes 204, a fuel nozzle insert sub-assembly 212, a plurality of end cover-to-combustor casing fasteners 210, a plurality of insert-to-end cover fasteners 214, and a plurality of cap-to-end cover fasteners 217. Alternatively, an existing body 208 may be retrofitted in accordance with the teachings described here. In the exemplary embodiment, cover sub-assembly 206 is coupled to combustor 104 (shown in FIG. 1) casings via fasteners 210, and atomizing air cartridge sub-assemblies 203 are coupled to end cover plate body 208.

Fuel nozzle assembly 200 also includes a plurality of fuel nozzle insert sub-assemblies 212 and a fuel nozzle sub-assembly 225. Fuel nozzle sub-assembly 225 includes a plurality of nozzle radially outer tubes 216, a plurality of intermediate tubes 223, a cap mounting flange 222, and a plurality of radially inner tubes 221, an annular diffusion fuel passage 219 and a fuel nozzle cap 224. In the exemplary embodiment, fuel nozzle insert sub-assembly 212 is coupled to end cover plate body 208 via fasteners 214, and a cap 224 is coupled to end cover plate body 208 via fasteners 217 and cap mounting flange 222.

During operation, fuel is channeled to fuel nozzle assembly 200 via at least one supply feed 202 from a fuel source (not shown in FIG. 2). Premix fuel is channeled to tube 216 via passage 218 and fuel nozzle insert sub-assembly 212 as illustrated by arrows. Diffusion fuel is channeled to passage 219 via tube 220 as illustrated by arrows. Combustion air is channeled from compressor 102 (shown in FIG. 1) to air supply tubes 204 prior to being channeled to tube 205 as illustrated by arrows. Generally, a plurality of fuel nozzle assemblies 200 are spaced circumferentially about rotor 110 (shown in FIG. 1) to ensure a circumferential stream of combustion gases, with a substantially uniform temperature is generated within combustor 104 and channeled to turbine 108 (shown in FIG. 1). A portion of fuel nozzle assembly 200, including insert sub-assembly 212, as illustrated within the dotted lines, is illustrated in FIG. 3 and described in more detail below.

Figure 3:
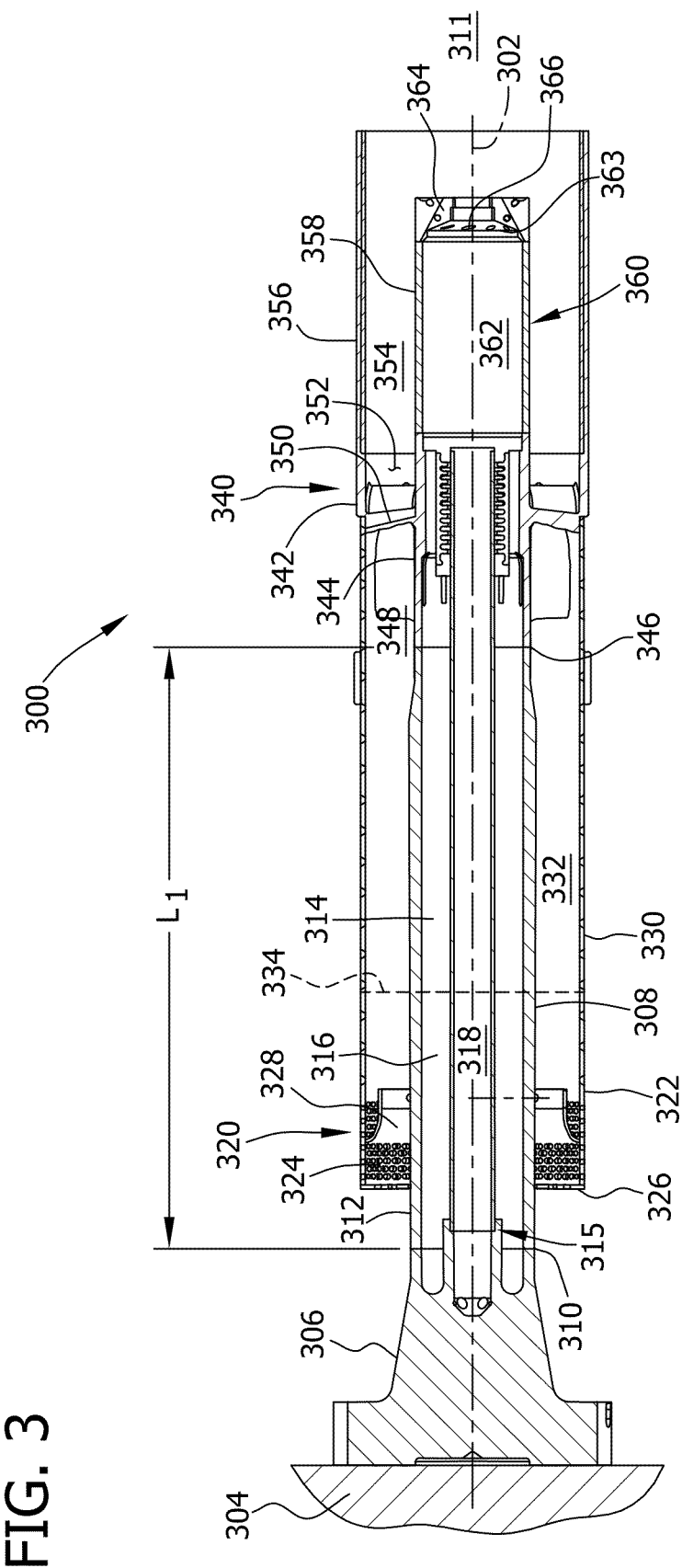
FIG. 3 is a cross-sectional schematic view of an exemplary fuel nozzle assembly that may be used with the turbine engine shown in FIG. 1.

FIG. 3 is an enlarged cross-sectional schematic view of an exemplary fuel nozzle assembly 300. In the exemplary embodiment, fuel nozzle assembly 300 has a centerline axis 302 and is coupled to an endcover 304 via a fuel nozzle flange 306. A premix tube 308 coupled to flange 306 at a first joint 310 includes a radially outer surface 312. In the exemplary embodiment, premix tube 308 is coupled to flange 306 via an electron beam weld. Alternatively, premix tube 308 may be coupled to flange 306 using any coupling device, such as, for example, a braze, screws, bolts, and/or any fastener that enables fuel nozzle assembly 300 to function as described herein. Premix tube 308 extends a variable length $L_1$ from joint 310 towards a combustion chamber 311. In the exemplary embodiment, length $L_1$ is manipulated to properly tune the natural frequency of fuel nozzle assembly 300, wherein the flange 306 and premix tube assembly operate at a natural frequency that is different than an operating rotor frequency (including first through fourth multiple of rotor frequency), combustion tones and siren tones of the gas turbine engine 100 (shown in FIG. 1).

Fuel nozzle assembly 300 includes a radially inner tube 314 that is coupled to flange 306 along a second joint 315. Tubes 308 and 314 define a substantially annular first premixed fuel supply passage 316. Additionally, inner tube 314 defines a diffusion fuel passage 318. In the exemplary embodiment, passages 316 and 318 are coupled in flow communication to a plurality of fuel sources (not shown in FIG. 3).

Fuel nozzle assembly 300 includes a substantially annular inlet flow conditioner (IFC) 320. In the exemplary embodiment, IFC 320 includes a radially outer wall 322 that includes a plurality of perforations 324, and an end wall 326 that is positioned on an aft end of IFC 320 and extends between wall 322 and surface 312. Walls 322 and 326, and surface 312 define a substantially annular IFC chamber 328 therebetween. Chamber 328 is in flow communication with a cooling passage (not shown in FIG. 3) via perforations 324. Fuel nozzle assembly 300 also includes a tubular transition member 330 that is coupled to wall 322. Transition member 330 defines a substantially annular transition chamber 332 that is substantially concentrically aligned with respect to first premixed fuel supply passage 316 and that is positioned such that an IFC outlet passage 334 extends between chambers 328 and 332.

In the exemplary embodiment, fuel nozzle assembly 300 also includes an air swirler assembly or swozzle assembly 340 for use with gaseous fuel injection. Swozzle 340 includes a substantially tubular shroud 342 that is coupled to transition member 330, and a substantially tubular hub 344 that is coupled to tube 308 along a joint 346. In the exemplary embodiment, hub 344 is coupled to tube 308 via an electron beam weld. Alternatively, hub 344 may be coupled to tube 308 using any coupling device, such as for example, a braze, screws, bolts, and/or any fastener that enables fuel nozzle assembly 300 to function as described herein. Shroud 342 and hub 344 define an annular chamber 348 therebetween, wherein a plurality of hollow turning vanes 350 extend between shroud 342 and hub 344. Chamber 348 is coupled in flow communication with chamber 332, and hub 344 includes a plurality of turning vane passages (not shown in FIG. 3) that are in flow communication with premixed fuel supply passage 316. A plurality of premixed gas injection ports (not shown in FIG. 3) are defined within hollow turning vanes 350. Similarly, hub 344 defines a plurality of secondary turning vane passages (not shown in FIG. 3) that are coupled in flow communication with premixed fuel supply passage 318 and a plurality of secondary gas injection ports (not shown in FIG. 3) that are defined within turning vanes 350. Inlet chamber 348 and the primary and secondary gas injection ports are coupled in flow communication with an outlet chamber 352.

Fuel nozzle assembly 300 includes a substantially annular fuel-air mixing passage 354 that is defined by a tubular shroud extension 356 and by a tubular hub extension 358. Passage 354 is coupled in flow communication with chamber 352, and extensions 356 and 358 are each coupled to shroud 342 and to hub 344, respectively.

A tubular diffusion flame nozzle assembly 360 is coupled to hub 344 such that an annular diffusion fuel passage 318 is at least partially defined. Assembly 360 also defines an annular air passage 362 in cooperation with hub extension 358. Fuel nozzle assembly 300 also includes a slotted gas tip 363 that is coupled to hub extension 358 and to assembly 360. Tip 363 includes a plurality of gas injectors 364 and air injectors 366, and coupled in flow communication with, and facilitates fuel and air mixing in, combustion chamber 311.

During operation, fuel nozzle assembly 300 receives compressed air from air supply tube 204 (shown in FIG. 2) via a plenum (not shown in FIG. 3) surrounding fuel nozzle assembly 300. Most of the air used for combustion enters assembly 300 via IFC 320 and is channeled to premixing components. Specifically, air enters IFC 320 via perforations 324 and mixes within chamber 328, and air exits IFC 320 via passage 334 and enters swozzle inlet chamber 348 via transition piece chamber 332. A portion of high pressure air entering air supply tube 204 is also channeled into an air-atomized liquid fuel cartridge (not shown in FIG. 3) inserted within diffusion fuel passage 318.

Fuel nozzle assembly 300 receives fuel from a fuel source (not shown in FIG. 3) via premixed fuel supply passage 316. Fuel is channeled from premixed fuel supply passage 316 to the plurality of primary gas injection ports defined within turning vanes 350.

Air channeled into swozzle inlet chamber 348 from transition piece chamber 332 is swirled via turning vanes 350 prior to being mixed with fuel, and the fuel/air mixture is then channeled into swozzle outlet chamber 352 for additional mixing. The fuel and air mixture is then channeled to mixing passage 354 prior to being discharged from assembly 300 into combustion chamber 311. In addition, diffusion fuel channeled through diffusion fuel passage 318 is discharged through gas injectors 364 into combustion chamber 311 wherein the diffusion fuel is mixed with, and combusts with, air discharged from air injectors 366.

Figure 4:
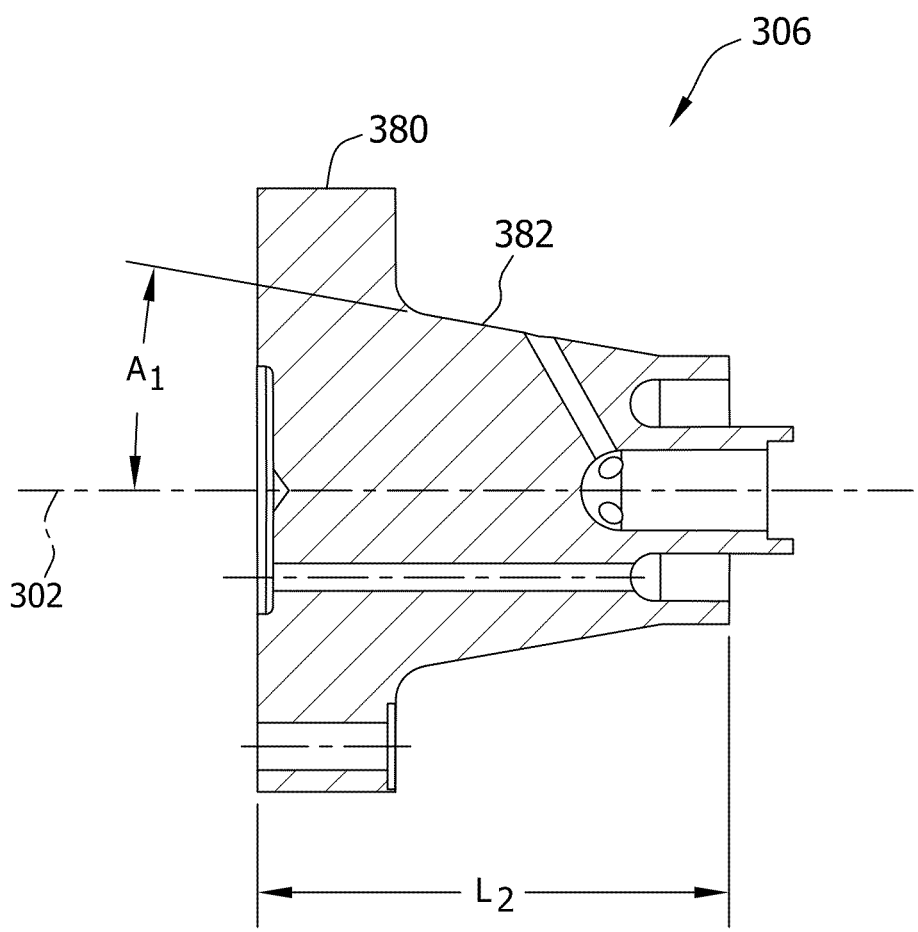
FIG. 4 is a cross-sectional schematic view of an exemplary flange extending from the fuel nozzle assembly shown in FIG. 3.

FIG. 4 is a cross-sectional schematic view of flange 306 used with fuel nozzle assembly 300. In the exemplary embodiment, flange 306 is fabricated to operate between a whole number frequency multiple of the operating frequency of gas turbine engine 100. More specifically, and in the exemplary embodiment, gas turbine engine 100 operates at a frequency of approximately 50 Hz. Flange 306 is fabricated to operate at a natural frequency that will substantially avoid 50 Hz or multiples thereof, such as for example 100 hertz, 150 hertz, 200 hertz, etc. More specifically, in the exemplary embodiment, flange 306 is fabricated to operate at a natural frequency of about 175 Hz to about 180 Hz. The exemplary embodiment applies to a Class 9 Gas Turbine but can be applied to multiple engine classes such as Class 7 with a 60 Hz rotor tone with multiple rotor tones of 120 Hz, 180 Hz and 240 Hz.

To ensure fuel nozzle assembly 300 operates with a desired natural frequency, flange 306 is fabricated with a centerline axis 302 and includes a mounting portion 380 and a substantially frusto-conical shaped body 382 that together define an outside length $L_2$ for controlling the desired natural frequency. In the exemplary embodiment, body 382 is converged and is fabricated with an angle $A_1$ of approximately 10° to enable fuel nozzle assembly 300 to operate at a frequency of between about 175 Hz to about 180 Hz. In the exemplary embodiment, length $L_2$ is approximately 3.75 in. (95.25 mm) and enables fuel nozzle assembly 300 to operate at a frequency of between about 175 Hz to about 180 Hz. Alternatively, body 382 may be fabricated with any angle $A_1$, and length $L_2$ may be any length that enables fuel nozzle assembly 300 to function as described herein.

Figure 5:
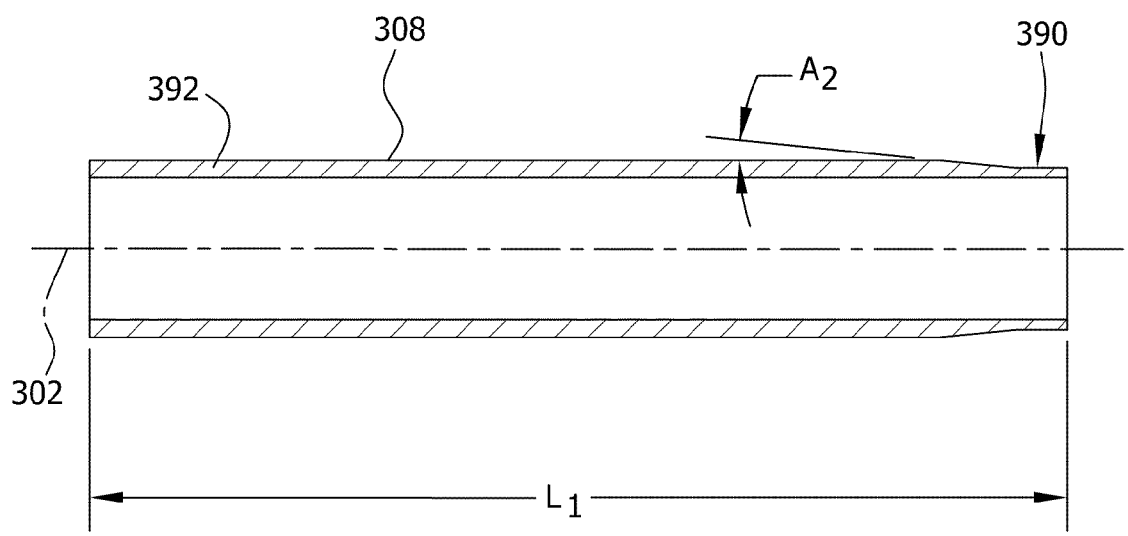
FIG. 5 is a cross-sectional schematic view of an exemplary premix tube used with the fuel nozzle assembly shown in FIG. 3.

FIG. 5 is a cross-sectional schematic view of premix tube 308. In the exemplary embodiment, premix tube 308 has a centerline axis 302 and is fabricated to operate at a frequency that is different than an operating frequency of gas turbine engine 100. More specifically, in the exemplary embodiment, premix tube 308 has a length $L_1$ of approximately 14 inches (in.) (357 millimeters (mm)), wherein premix tube 308 operates at a frequency that is different than an operating frequency of gas turbine engine 100 (shown in FIG. 1) i.e., 50 hertz or multiples thereof). Alternatively, $L_1$ may be any length that enables fuel nozzle assembly 300 to function as described herein.

In the exemplary embodiment, premix tube 308 includes a tapered portion 390 that enables a greater air flow through fuel nozzle assembly 300, and more specifically through swozzle assembly 340 (shown in FIG. 3). In the exemplary embodiment, tapered portion 390 is formed with at an angle $A_2$ of about 5°. Alternatively, tapered portion 390 may converge at any angle $A_2$ that enables fuel nozzle assembly 300 to function as described herein. Moreover, in the exemplary embodiment, premix tube 308 includes an outer wall 392 that has a thickness T of approximately 0.19 (in.) (4.76 (mm)). Alternatively, outer wall 392 may be formed with any thickness T that enables fuel nozzle assembly 300 to function as described herein.

Exemplary embodiments of fuel nozzle assemblies are described in detail above. The above-described systems are used to deliver a mixture of fuel and air to the engine's combustion chamber, and are fabricated to balance the frequency margin within the engine, while providing a more robust and resilient design immediately upstream from the combustion chamber. More specifically, the flange and premix tube within each fuel nozzle assembly integrates both a structural design and a natural frequency tuning to optimize the design to balance the frequency margin, low cycle fatique (LCF), high cycle fatique (HCF) capability and aerodynamic impact. Such fuel nozzle assemblies facilitate reducing stress concentrations, minimizing break-out into fuel holes, and facilitate more enhanced tuning of natural frequencies to provide adequate frequency margin with rotor speeds and combustion tones with minimized aerodynamic interference.

Moreover, the systems and method described herein eliminate a braze joint between the flange and premix tube by utilizing an electron beam welded joint that facilitates enhancing the structural strength of the fuel nozzle assembly and enhances the resilience of the fuel nozzle assembly. Moreover, the systems and methods facilitate increasing the durability of the fuel nozzle assembly during engine operations. The contour of the flange and the shape of the premix tube and the thickness of the premix tube wall are variably selected to facilitate controlling and improving the natural frequency margin, LCF, and HCF, thereby optimizing the design to provide a robust durable component and extending product life.

Although the apparatus and methods described herein are described in the context of fuel nozzle assemblies for gas turbine engines, it is understood that the apparatus and methods are not limited to such applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel nozzle assembly for a gas turbine engine including a rotor and a combustor, said fuel nozzle assembly comprising:
    a flange that extends from a flange first end to a flange second end, said flange first end comprises a mounting portion configured to couple to an end cover of the combustor, said flange comprises an integrally formed substantially frusto-conical shaped body that extends between said mounting portion and said flange second end, wherein said flange defines a first pre-determined length between said flange first and second ends that facilitates raising a first frequency of said flange during operation above an operating frequency of the rotor, such that a multiple of the first frequency is different from a multiple of the operating frequency of the rotor; and
    a pre-mix tube that extends from a tube first end to a tube second end, said tube first end coupled to said flange at a first joint proximate said flange second end, said pre-mix tube defines a second pre-determined length between said tube first and second ends that facilitates raising a second frequency of said pre-mix tube during operation above the operating frequency of the rotor, such that a multiple of the second frequency is different from a multiple of the operating frequency of the rotor, wherein said tube second end is inwardly tapered.

2. A fuel nozzle assembly in accordance with claim 1, wherein said first joint comprises an electron beam weld.

3. A fuel nozzle assembly in accordance with claim 1, wherein said substantially frusto-conical shaped body includes an angle of convergence to facilitate controlling a natural frequency of said flange.

4. A fuel nozzle assembly in accordance with claim 1, wherein said flange and said pre-mix tube are fabricated to operate between a whole number frequency of the operating frequency of the rotor.

5. A fuel nozzle assembly in accordance with claim 4, wherein said flange is fabricated to operate at a natural frequency of about 175 Hz to about 180 Hz.

6. A fuel nozzle assembly in accordance with claim 1, further comprising an end cap assembly coupled to said tube second end.

7. A fuel nozzle assembly in accordance with claim 6, wherein said end cap assembly is coupled to said tube second end via an electron beam weld.

8. A fuel nozzle assembly in accordance with claim 6, further comprising:
    a swirler assembly coupled to said tube second end via an electron beam weld; and
    a tip tube coupled to said swirler assembly via an electron beam weld.

9. A fuel nozzle assembly in accordance with claim 8, further comprising a tip assembly coupled to a downstream end of said tip tube via an electron beam weld.

10. A gas turbine engine comprising:
    a rotor;
    a combustor comprising an end cover surface; and
    a fuel nozzle assembly comprising:
        a flange that extends from a flange first end to a flange second end, said flange first end comprises a mounting portion configured to couple to said end cover surface, said flange comprises an integrally formed substantially frusto-conically shaped body that extends between said mounting portion and said flange second end, wherein said flange defines a first pre-determined length between said flange first and second ends that facilitates raising a first frequency of said flange during operation above an operating frequency of said rotor, such that a multiple of the first frequency is different from a multiple of the operating frequency of said rotor; and
        a pre-mix tube that extends from a tube first end to a tube second end, said tube first end coupled to said flange at a first joint proximate said flange second end, said pre-mix tube defines a second pre-determined length between said tube first and second ends that facilitates raising a second frequency of said pre-mix tube during operation above the operating frequency of said rotor, such that a multiple of the second frequency is different from a multiple of the operating frequency of said rotor, and wherein said pre-mix tube second end is inwardly tapered.

11. A gas turbine engine in accordance with claim 10, wherein said first joint comprises an electron beam weld.

12. A gas turbine engine in accordance with claim 10, wherein said substantially frusto-conical shaped body includes an angle of convergence to facilitate controlling a natural frequency of said flange.

13. A gas turbine engine in accordance with claim 10, wherein said flange and said pre-mix tube are fabricated to operate between a whole number frequency of the operating frequency of said rotor.

14. A gas turbine engine in accordance with claim 13, wherein said flange is fabricated to operate at a natural frequency of about 175 Hz to about 180 Hz.

15. A gas turbine engine in accordance with claim 10, further comprising an end cap assembly coupled to said tube second end.

16. A gas turbine engine in accordance with claim 15, wherein said end cap assembly is coupled to said tube second end via an electron beam weld.

17. A gas turbine engine in accordance with claim 15, further comprising:
- a swirler assembly coupled to said tube second end via an electron beam weld; and
- a tip tube coupled to said swirler assembly via an electron beam weld.

18. A gas turbine engine in accordance with claim 17, further comprising a tip assembly coupled to a downstream end of said tip tube via an electron beam weld.

\* \* \* \* \*